H. T. DURANT.
SEPARATION OF SOLIDS FROM LIQUIDS.
APPLICATION FILED APR. 24, 1908.
924,043.
Patented June 8, 1909.
4 SHEETS—SHEET 2.
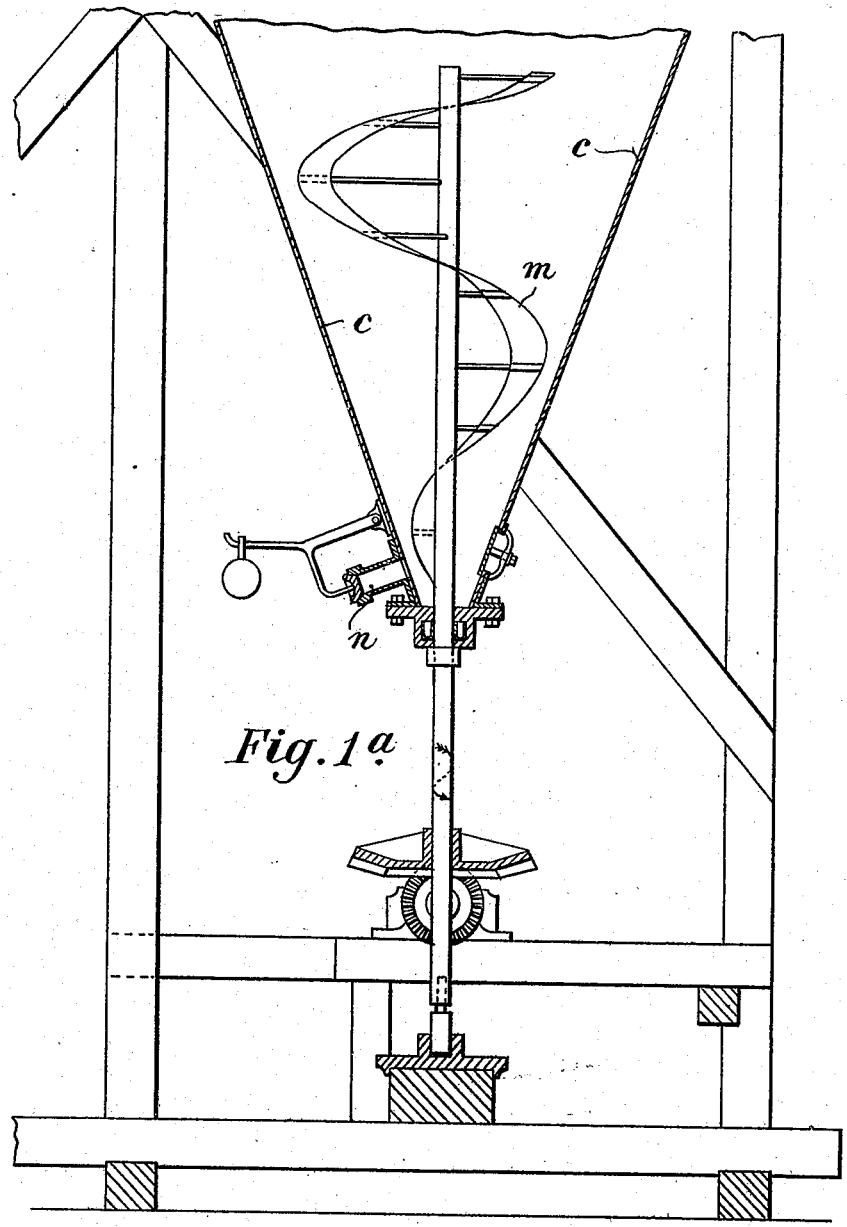
Fig. 1ª
WITNESSES:
Fred White
René Muine
INVENTOR:
Henry Thomas Durant,
By Attorneys,

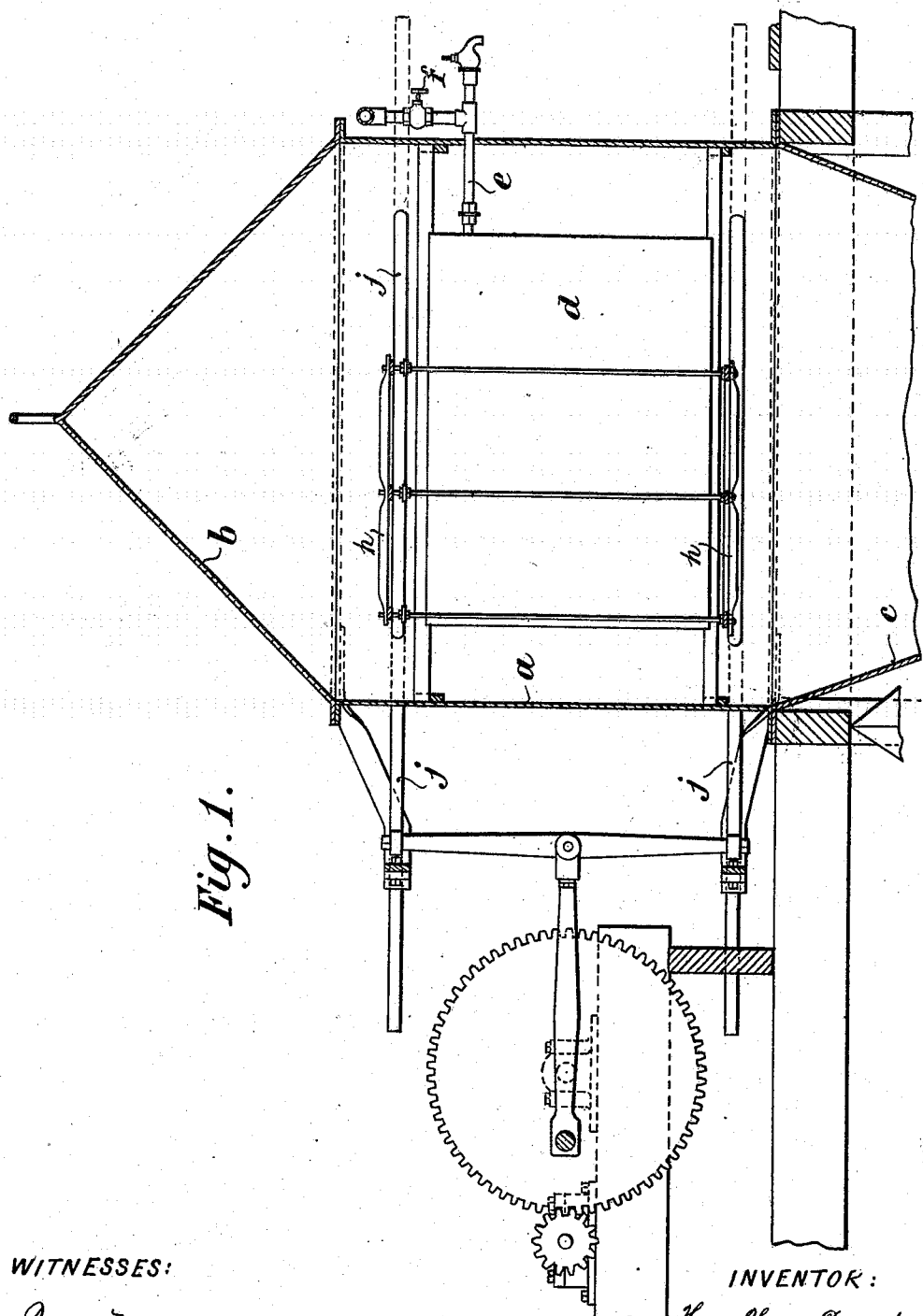

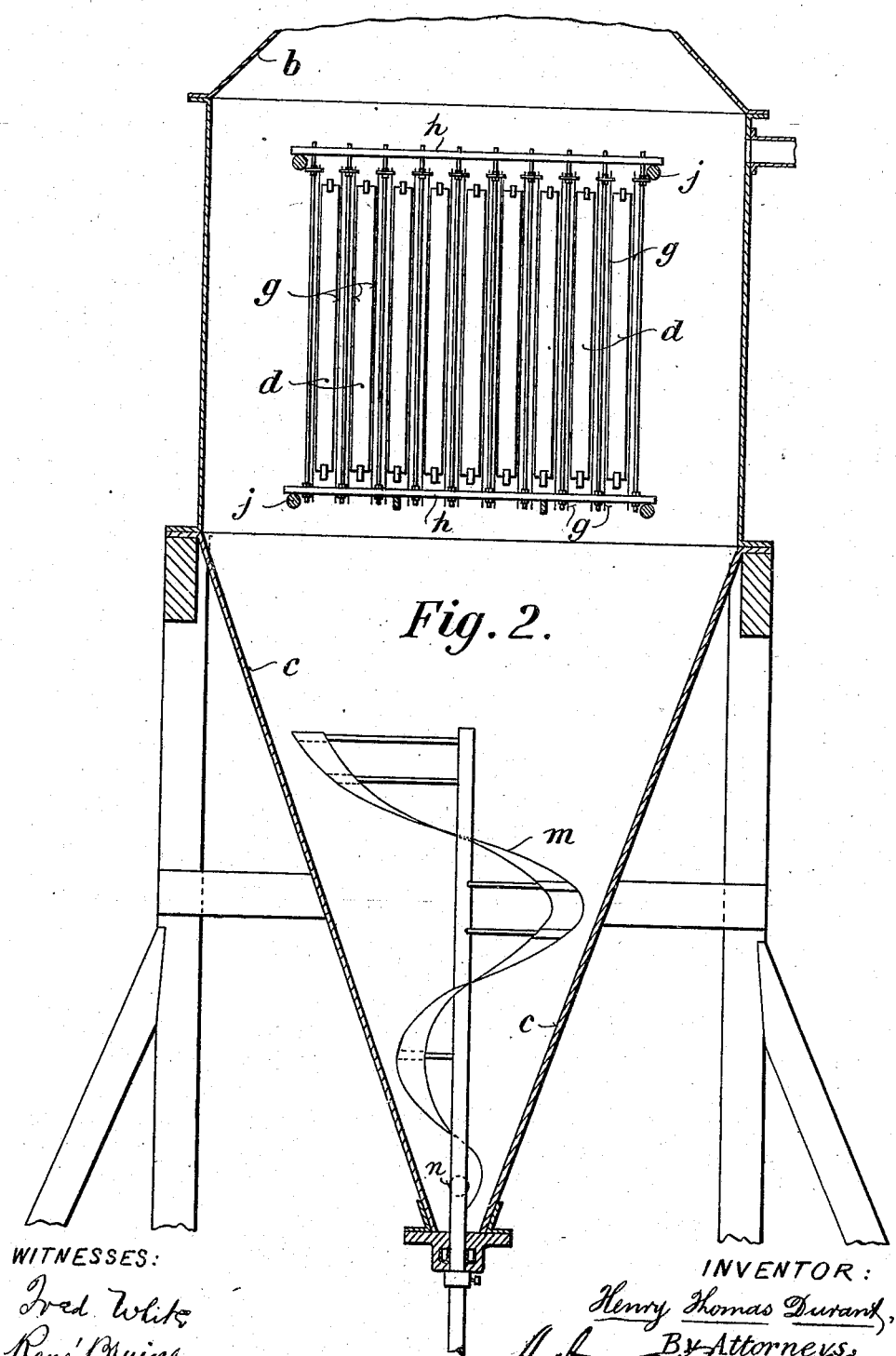

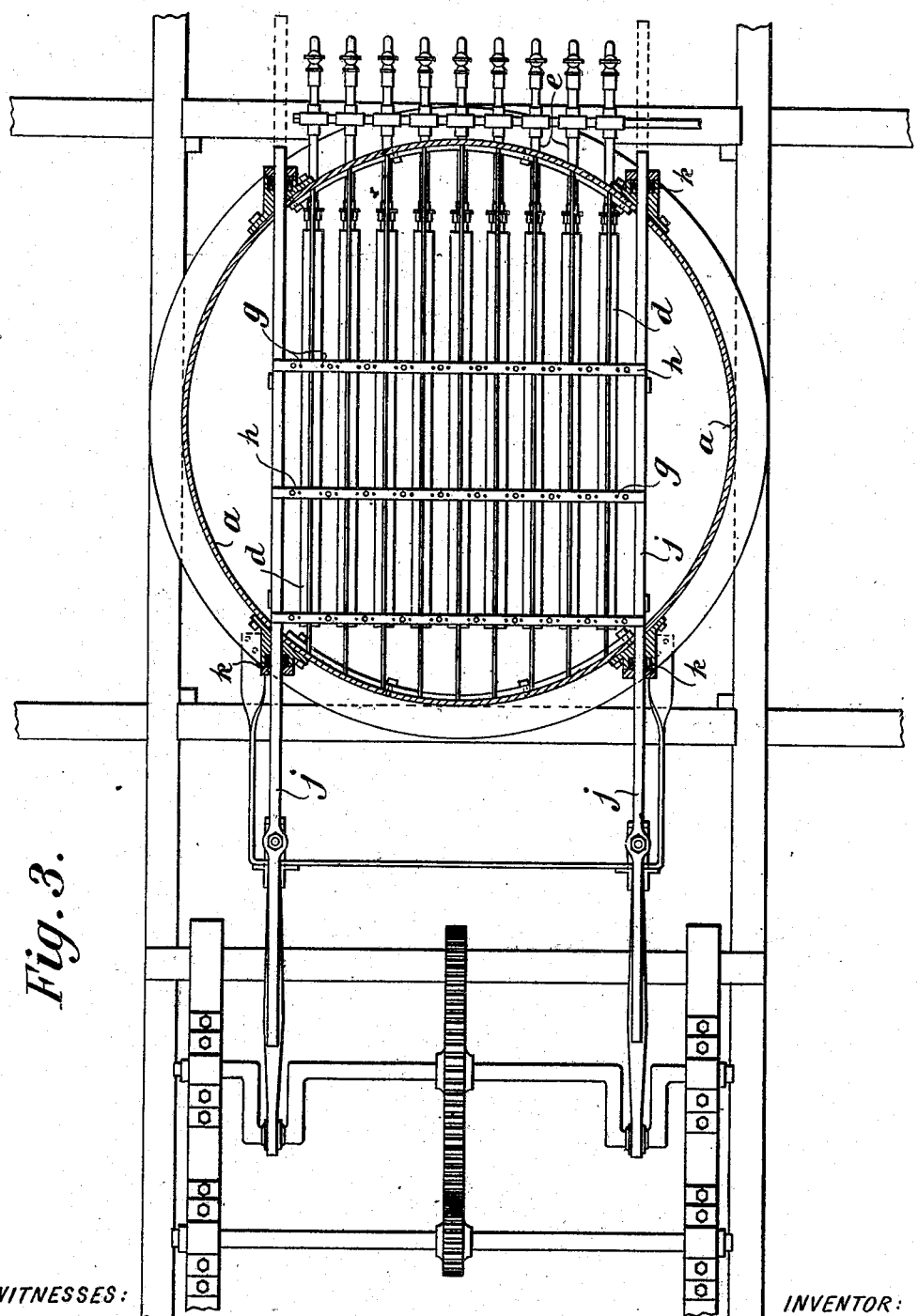

UNITED STATES PATENT OFFICE.

HENRY THOMAS DURANT, OF BULAWAYO, RHODESIA, ASSIGNOR TO LOUIS THOMAS DECHOW AND ROBERT TWEEDALE, BOTH OF BULAWAYO, SOUTH AFRICA.

SEPARATION OF SOLIDS FROM LIQUIDS.

No. 924,043.     Specification of Letters Patent.     Patented June 8, 1909.

Application filed April 24, 1908. Serial No. 428,960.

*To all whom it may concern:*

Be it known that I, HENRY THOMAS DURANT, of Bulawayo, Rhodesia, South Africa, engineer, have invented certain new and useful Improvements in and Relating to the Separation of Solids from Liquids, of which the following is a specification.

This invention relates to the separation of solids from liquids and has for its object to provide improved means whereby the process may be carried on continuously.

Apparatus made in accordance with this invention comprises a closed vessel containing filtering plates and scrapers and are so arranged that while the solid and liquid matters are together fed into said vessel by a pump, the liquid is forced by the pressure of the pump through the filtering material into hollow filter plates and escapes from the interior of said plates through the side of the closed vessel by means of pipes. The solid matter is continuously removed by scrapers from the face of the filtering material and falls to the bottom of the vessel and is suitably discharged.

Referring to the drawings Figures 1 and 1ª show sectional front elevations of one form of apparatus made in accordance with this invention; Fig. 2 is a sectional side elevation. Fig. 3 is a sectional plan.

In one form of apparatus made in accordance with this invention and shown in the drawings $a$ is a closed cylindrical vessel, and is provided with a conical top $b$ and conical base $c$ and is capable of withstanding internal pressure.

$d\,d$ are hollow filtering plates of ordinary construction and they are provided with pipes $e$ leading from the interiors of said filtering plates to the outside of the closed vessel $a$, each pipe has a cock $f$ so that any one or more plates may be cut off. Between the filter plates are arranged scrapers comprising a series of wires $g\,g$ mounted on a frame $h$ and adapted to be reciprocated, said wires bearing against or being close to the surfaces of the filtering plates. The frame $h$ on which the scrapers are mounted is suitably operated from outside the vessel $a$ through the medium of connecting rods $j$ passing through stuffing boxes $k$. In the conical base $c$ of the closed vessel is disposed a helical scraper $m$ adapted to be rotated and to scrape the solid material from the conical bottom and force it out through a discharge valve $n$.

In operation, the solid and liquid materials are forced into the closed vessel $a$ under suitable pressure the solid material is scraped from the filtering plates as soon as deposited, falls into the conical bottom $c$ and is collected and discharged, while the liquid material is drawn off through the filter. The scrapers may be arranged either parallel and adapted to reciprocate, or they may radiate from a hub and be rotated, and they may consist of flat steel, steel wire, hardwood or other suitable material. In order to cleanse the apparatus, the direction of pressure may be reversed and water forced through the filter plates and closed vessel.

By the use of apparatus made in accordance with this invention the process of separation of solid from liquid matter may be carried on continuously.

What I claim and desire to secure by Letters Patent is:—

Apparatus for separating solids from liquids comprising the combination of a closed vessel, a conical base to said closed vessel, a helical scraper disposed in said conical base, means for rotating said scraper, hollow filter plates disposed in said closed vessel, pipes communicating from the interior of said plates to the outside of the closed vessel, scrapers disposed between the filter plates and means for moving said scrapers.

In witness whereof, I have hereunto signed my name in the presence of two subscribing witnesses.

HENRY THOMAS DURANT.

Witnesses:
    JOHN HENRY NEWBERRY,
    FREDERICK CHARLES DOSELL.